(12) United States Patent
Tuculescu et al.

(10) Patent No.: US 10,462,195 B2
(45) Date of Patent: *Oct. 29, 2019

(54) METHODS, APPARATUS AND/OR SYSTEM FOR USING EMAIL TO SCHEDULE AND/OR LAUNCH GROUP COMMUNICATIONS SESSIONS

(71) Applicant: Intermedia.net, Inc., Mountain View, CA (US)

(72) Inventors: Costin Tuculescu, Westminster, CA (US); Eli Burpee, Portland, OR (US)

(73) Assignee: Intermedia.net, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/156,539

(22) Filed: Oct. 10, 2018

(65) Prior Publication Data
US 2019/0098059 A1 Mar. 28, 2019

Related U.S. Application Data

(63) Continuation of application No. 14/883,357, filed on Oct. 14, 2015, now Pat. No. 10,122,769.
(Continued)

(51) Int. Cl.
*H04L 29/06* (2006.01)
*H04L 29/12* (2006.01)

(52) U.S. Cl.
CPC ........ *H04L 65/1073* (2013.01); *H04L 61/303* (2013.01); *H04L 61/307* (2013.01); *H04L 65/1069* (2013.01); *H04L 65/403* (2013.01)

(58) Field of Classification Search
CPC . H04L 65/1073; H04L 61/307; H04L 61/303; H04L 65/1069; H04L 65/403
See application file for complete search history.

(56) References Cited

U.S. PATENT DOCUMENTS 8,600,027 B1 12/2013 Doerr et al.
9,608,832 B1 3/2017 Shukla et al.
(Continued)

OTHER PUBLICATIONS

"U.S. Appl. No. 14/883,357, Examiner Interview Summary dated Mar. 8, 2018", 14 pgs.
(Continued)

*Primary Examiner* — Chris Parry
*Assistant Examiner* — Caroline H Jahinge
(74) *Attorney, Agent, or Firm* — Schwegman Lundberg & Woessner, P.A.

(57) ABSTRACT

Methods and system for scheduling or launching online and phone sessions between two or more people via email and other electronic communication channels without the requirement for an account with the session service provider when scheduling the session. By including a designated service provider email address in the recipient list of the host's email or meeting invitation, a user account can be, and in some embodiments is automatically created by the service provider system in response to receipt of such an Email and session invitations are automatically sent to the host and invitees designated in the host's email or meeting invitation. In this way the host and invites calendars can be automatically updated and populated with session information and information on how to joint the session, e.g., on-line meeting or conference. The Email from the communications provider system can, and in some embodiments does, take the form of an updated invite Email message with the information in the Email from the service provider system updating or replacing information supplied by the original invite from the host.

20 Claims, 7 Drawing Sheets

Related U.S. Application Data

(60) Provisional application No. 62/146,231, filed on Apr. 10, 2015, provisional application No. 62/063,927, filed on Oct. 14, 2014.

(56) References Cited

U.S. PATENT DOCUMENTS

| | | |
|---|---|---|
| 9,716,861 B1 | 7/2017 | Poel et al. |
| 10,122,769 B1 | 11/2018 | Tuculescu et al. |
| 2010/0217806 A1 | 8/2010 | Khot et al. |
| 2011/0075826 A1* | 3/2011 | Block .................. H04M 3/565 379/142.04 |
| 2012/0164997 A1 | 6/2012 | Iyer |
| 2019/0141093 A1 | 5/2019 | Tuculescu et al. |

OTHER PUBLICATIONS

"U.S. Appl. No. 14/883,357, Non Final Office Action dated Nov. 27, 2017".

"U.S. Appl. No. 14/883,357, Notice of Allowance dated Jul. 11, 2018", 9 pgs.

"U.S. Appl. No. 14/883,357, Response filed Mar. 14, 2018 to Non Final Office Action dated Nov. 27, 2017", 12 pgs.

U.S. Appl. No. 14/883,357, filed Oct. 14, 2015, Methods, Apparatus and/or System for Using Email to Schedule and/or Launch Group Communications Sessions.

* cited by examiner

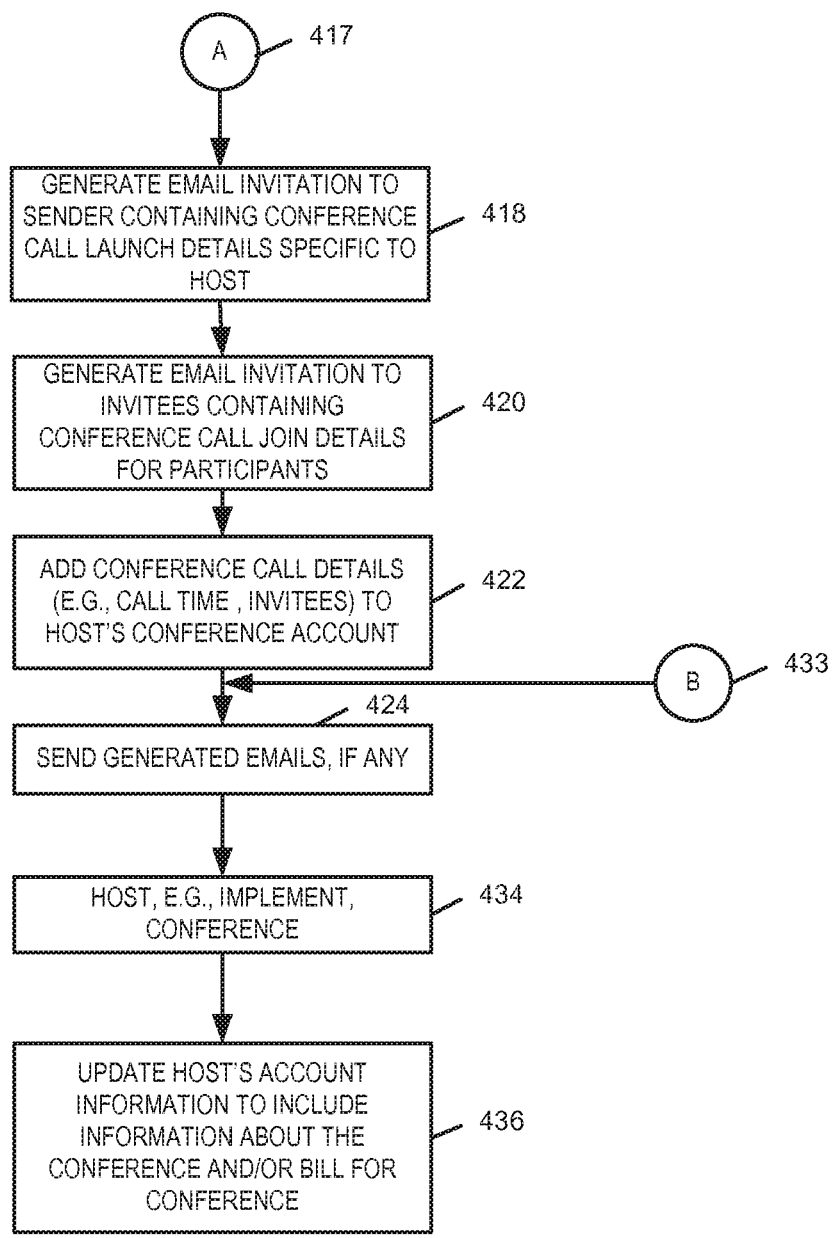

METHODS, APPARATUS AND/OR SYSTEM FOR USING EMAIL TO SCHEDULE AND/OR LAUNCH GROUP COMMUNICATIONS SESSIONS

RELATED APPLICATIONS

The present application claims the benefit of U.S. Provisional Patent Application Ser. No. 62/063,927 filed Oct. 14, 2014 and U.S. Provisional Patent Application Ser. No. 62/146,231 filed Apr. 10, 2015 both of which are hereby expressly incorporated by reference in their entirety.

FIELD

The present application relates to methods and apparatus for using Email to schedule and/or establish communications sessions supported by a service provider, e.g., without requiring prior establishment of an account with the provider.

BACKGROUND

Internet communications and network communications allow for meetings and conferences to be scheduled and conducted over networks such as the Internet. While networks such as the Internet may make conducting a communications session easier from a network perspective, the larger number of entities that may seek to establish meetings creates the possibility that a party seeking to establish a communications session may be unknown to the communications device which the party is seeking to use in establishing the communications session.

In addition, a user may want to establish a communications session using Emails to communicate with potential meeting participants. Thus, a conferencing system may be confronted with the technical problem of how to set up a meeting for a potential host who may be previously unknown to the conferencing system and may be seeking to use one or more Emails to set up a meeting to be conducted over the Internet or another communications network.

A variety of services exist that enable users to schedule and launch online meetings and phone conferences, including traditional web conferencing services like Cisco's WebEx and Citrix's GoToMeeting as well as newer, more consumer-oriented services like Google Hangouts and Skype.

Meeting service providers often require that the party seeking to establish a communications session and/or session participants hold accounts with the service provider before the service provider will proceed with setting up a meeting or other session. Thus, Internet based meeting services often require that the meeting host have an account with the service provider before launching or scheduling such group sessions.

In addition, enabling hosts to schedule or launch such sessions directly from within their calendars of choice typically requires that a service provider integrate its solution into each major calendar application, and that end users of its service—or often the end users' system administrators—install the plug-in that enables the integrated service.

These factors create significant barriers to user adoption of such group communication services and greatly constrain the growth of the conferencing industry.

Know approaches to establish communications sessions fail to address the communications centric problem of how and/or whether to establish a meeting for an entity which was previously unknown to the service provider and/or the service providers conferencing system but which may want to establish a communications session through the use of one or more Email messages.

To significantly broaden the adoption of group communication services, therefore, there is a need for improvements, which would allow a person or other entity, sometimes referred to as a host, to schedule and launch group (2 or more people) online and phone sessions without requiring that the host have an account with the service provider in advance of launching or scheduling the session. There is also the need for the ability to launch and/or schedule such sessions directly from within the user's calendar of choice without a requirement to install additional software.

In addition, the ability for a user to easily designate the desired type of group session (e.g. phone conference, online meeting, screen sharing, online presentation, etc.) could further enhance the user experience and would be desirable if it were possible.

SUMMARY

Communications related methods and apparatus are described. The methods and apparatus are directed to the communications centric problem of how to establish a meeting, e.g., a conference or multi-party session, via a network based conferencing device, without requiring a host or other party to have an account with a service provider operating the conference device or preexisting information stored in the conferencing device relating to the host or potential conference participants. The methods and apparatus are particularly well suited to the Internet or other network environments where one or more parties which were previously unknown to a conferencing server may contact the conferencing server via the network, e.g., Internet, to initiate a conference or other network based meeting.

Methods and system for scheduling or launching online and phone sessions between two or more people via email and other electronic communication channels without the requirement for an account with the session service provider when scheduling the session are described. By including a designated service provider email address in the recipient list of the host's email or meeting invitation, a user account can be, and in some embodiments is, automatically created by the service provider system, in response to receipt of such an Email and session invitations are automatically sent to the host and invitees designated in the host's email or meeting invitation. In this way the host and invitees calendars can be automatically updated and populated with session information and information on how to joint the session, e.g., on-line meeting or conference. The Email from the communications provider system can, and in some embodiments does, take the form of an updated invite Email message with the information in the Email from the service provider system updating or replacing information supplied by the original invite from the host.

An exemplary method of establishing a communications conference, in accordance with some embodiments, includes: receiving an Email including a list of email addresses said list including at least one email address corresponding to an intended conference session participant and an Email address of a conference session provider; identifying from a sender Email address included in the received Email a host of a meeting; determining if the host of the meeting has an account with the conference session provider; and if the host of the meeting does not have an account with the conference session provider establishing an account with the conference session provider.

An exemplary conference system, in accordance with some embodiments, includes: an interface configured to receive an Email including a list of email addresses said list including at least one email address corresponding to an intended conference session participant and an Email address of a conference session provider; and a processor configured to: identify from a sender Email address included in the received Email a host of a meeting; determine if the host of the meeting has an account with the session provider; and if the host of the meeting does not have an account with the session provider establish an account with the session provider.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

BRIEF DESCRIPTION OF THE DRAWINGS

FIG. 4B is a second part of an exemplary flow chart showing steps performed by a server or combination of devices, such as by the service provider system shown in FIG. 2, which can be used to set up and/or establish a conference call or video conference via Emails that can be sent as part of the conference set up process.

FIG. 4 comprises the combination of FIG. 4A and FIG. 4B.

DETAILED DESCRIPTION

Figure 1:
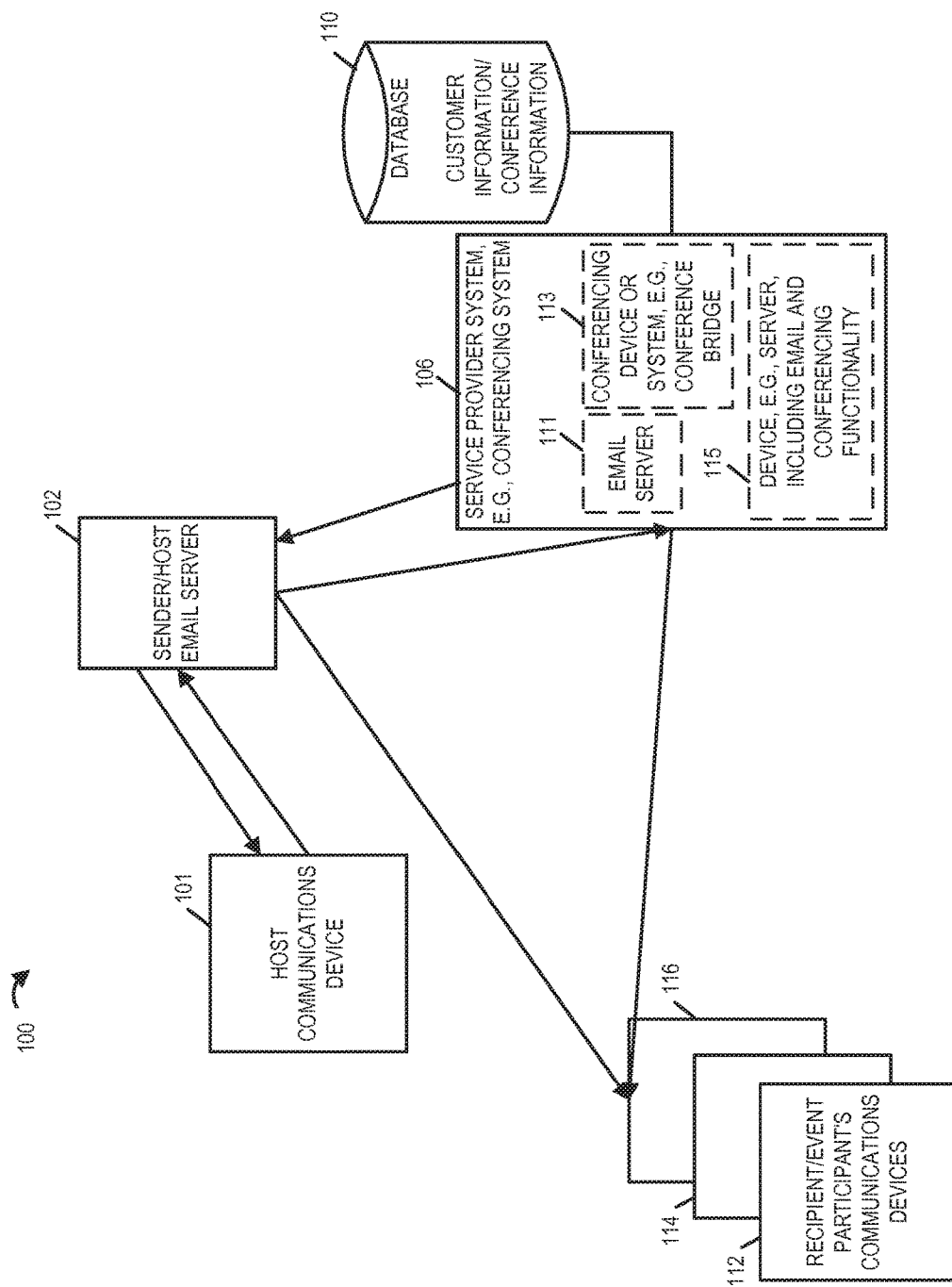
FIG. 1 illustrates an exemplary system including a host device, recipient devices, a service provider system which can be used to support a variety of different types of conferences in accordance with the present invention which can be established via Email communications.

FIG. 1 illustrates an exemplary system 100 in which the methods and apparatus of the present invention are used. The system 100 includes a host communications device 101 which can send and receive Emails as part of establishing an on-line meeting, telephone conference or other communications session. Device 101 is referred to as the host communications device because it corresponds to and is used by a user which seeks to initiate a meeting or other communications session with other individuals and act as the host during the meeting. As will be discussed below, the host communications device 101 sends and receives Emails through the Email server 102 which is identified as a sender/host Email server since it services the host 101. The Email server 102 is also used to service other devices (112, 114, 116) and can be used to communicate Emails to/from potential meeting participants as well as the service provider system 106. The Email server 111, device 113 and/or server 115 are in some embodiments implemented in hardware.

Service provider system 106 has one or more Email addresses associated with it. When an Email is sent that includes an Email of the service provider system as a recipient address, the Email will be directed to the service provider system 106. Multiple different Emails may be associated with the service provider system 106 with the particular Email address being used to indicate the type of communications session to be established as well as to direct the Email to the service provider system 106. As will be discussed below, an Email initiating a conference or on-line meeting may include in a list of recipient Email addresses, Email addresses of the invitees as well as an Email address of the service provider system. In this way, a user of a host device can initiate an on-line meeting, phone conference, video conference, etc. by simply sending an Email directed to the invitees as well as the service provider system.

The service provider system 106 can be, and in some embodiments is, implemented as a combination of an Email server 111 and conferencing device or system 113. The service provider system 106 can be, and in some embodiments is, implemented as a device 115, e.g., a server including email and conferencing functionality. The service provider system 106 includes hardware for receiving and sending Emails as well as for supporting an on-line communications session, e.g., an on-line meeting. Thus the service provider system 106 is implemented in some embodiments as a combination of an Email device and conference bridge or multimedia device which supports on-line conferencing. The service provider system 106 also includes, in some embodiments, hardware and/or software for generating and maintaining customer profiles and/or records. The customer profiles/records are stored in the database 110 which includes memory for storing the content of the customer profile and/or record along with an interface and/or processor for supporting storage and data retrieval operations. Thus, the service provider system 106 can access and store customer profiles and records. The customer profile may be part of a customer record which can include billing, usage and/or other information such as demographic information about customer which can be used for targeting of advertisements in some embodiments. The database 110 may be part of the service provider system 106 even though it is shown external thereto.

Figure 2:
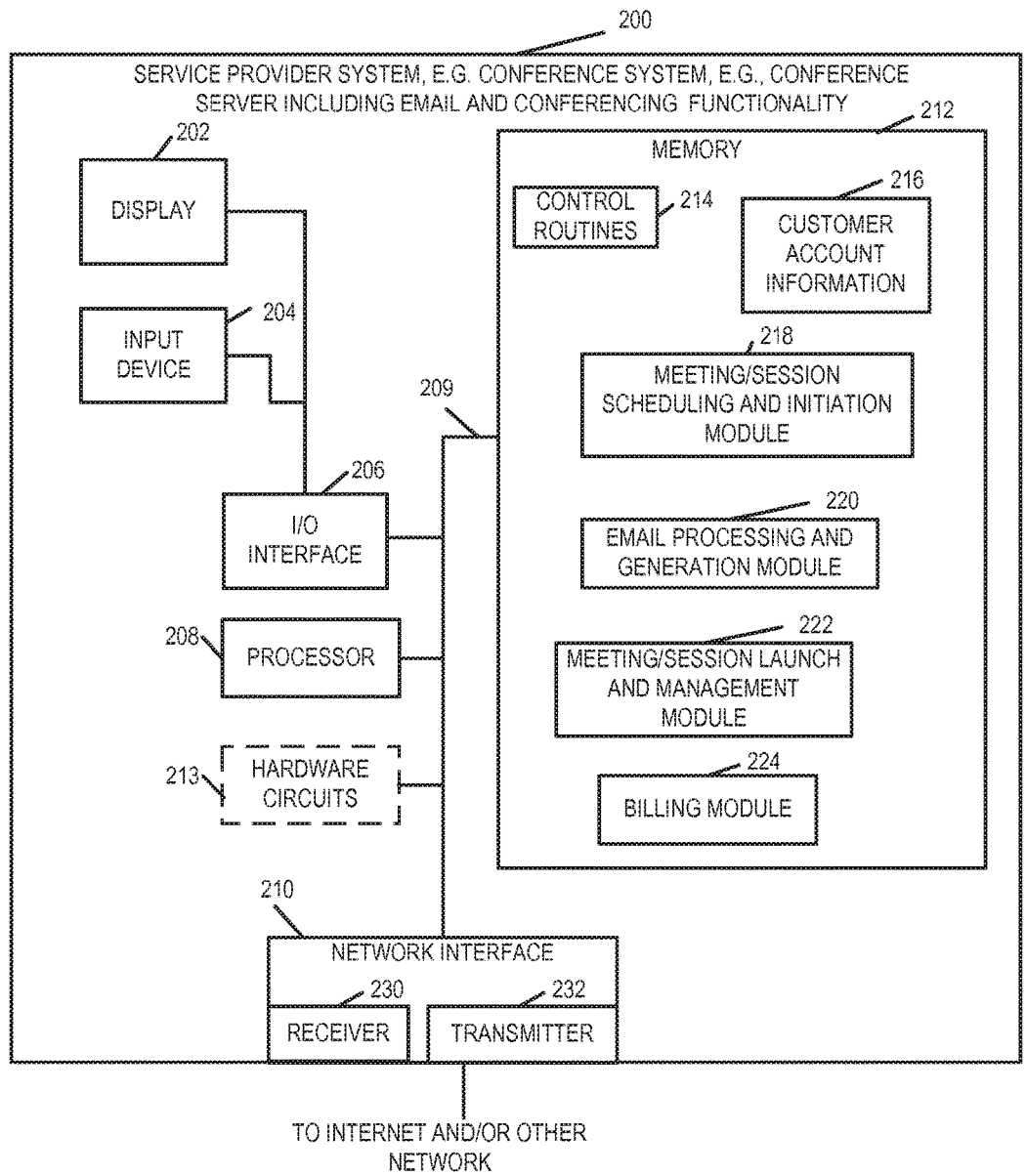
FIG. 2 illustrates an exemplary service provider system, e.g., conference system which can be implemented as an audio, video or multimedia conference server, which can be used in the system of FIG. 1 in accordance with one exemplary embodiment of the invention.

The service provider system 106 can be implemented using a device 200 such as the one shown in FIG. 2 which includes a memory 212 including various modules, a network interface 210, a display 202, input device 204 and processor 208. The input device 204 and display 202 are coupled to a bus 209 via an I/O interface 206. The processor 208, the memory 212, the I/O interface 206, and the network interface 210 are coupled together via the bus 209 over which the various elements (208, 212, 206, 210) may interchange data and information. The memory 212 includes various modules and/or routines 214, 218, 220, 222, and 224 in addition to customer account information 216. When executed by the processor 208 the routines and/or modules (214, 218, 220, 222, 224) cause the processor to control the system 200 to implement the steps of the method described herein. While in FIG. 2 the modules and routines are shown as being stored in memory 212, in some embodiments hardware circuits 213 are included in the device 200 and used to perform the functions associated with the modules/routines and/or to control the apparatus 200 as described. The network interface 210 includes a receiver 230 which can be used to receive Emails and various signals and a transmitter 232 which can be used to send Emails and/or various signals.

Control routines 214 control the operation of device 200. Customer account information 216 includes information corresponding to existing and new user accounts. In some embodiments customer account information 216 is stored in memory 212. In some embodiments, customer account information 216 is stored in a database external to device 200, e.g., customer information/conference information database 110 and retrieved by device 200 as needed. Meeting/session scheduling and initiation module 218 schedules meeting and session in response to requests from host devices. Email processing and generation module 220 processes received emails, e.g., a received Email from host device 101, and generate response emails, e.g., a response email to the host device and a response email to one or more intended participants in a conference. An exemplary received Email from a host device requesting a communications session is, e.g., a regular type email or a session/activity invitation type email. A generated response email to a host indicates information used to establish the communications session. A generated response email to an invitee includes information to allow the invitee to participate in the communications session. Email processing and generation module 220 is configured to identify types of emails, e.g., regular or invitation types, identify type of conferences, identify hosts, and identify conference invitees, based on information included in a received Email and/or based on stored information. The stored information may be included in the memory 212. Exemplary stored information included information identifying a key word, e.g. "invite" or key identifier used to indicate an invitation type Email, and information mapping different service provider email addresses to different types of conferences which may be requested. Meeting/session launch and management module 222 is configured to support the launch and operation of a meeting/session, e.g., performing conference bridging operation and functions to support the session. Billing module 224 is configured to perform billing functions, e.g., establishing new user accounts, charging a host for a communications session which was established and/or supported via the service provider system.

The conference system 200 can receive, process and send Emails relating to establishment of an on-line meeting or other communications session under control of module 218 while meeting session launch and management module 222 can be used to establish a multiply communications session, e.g., control bridging of VOIP or other calls or sessions, and maintain the multi-party communications session for the duration of the meeting or conference.

A host, e.g., device 101, can initiate an on-line or other meeting via Email with or without a prior customer record being present in the database 110 with the service provider conference system 200 creating/updating customer records as necessary.

Figure 3:
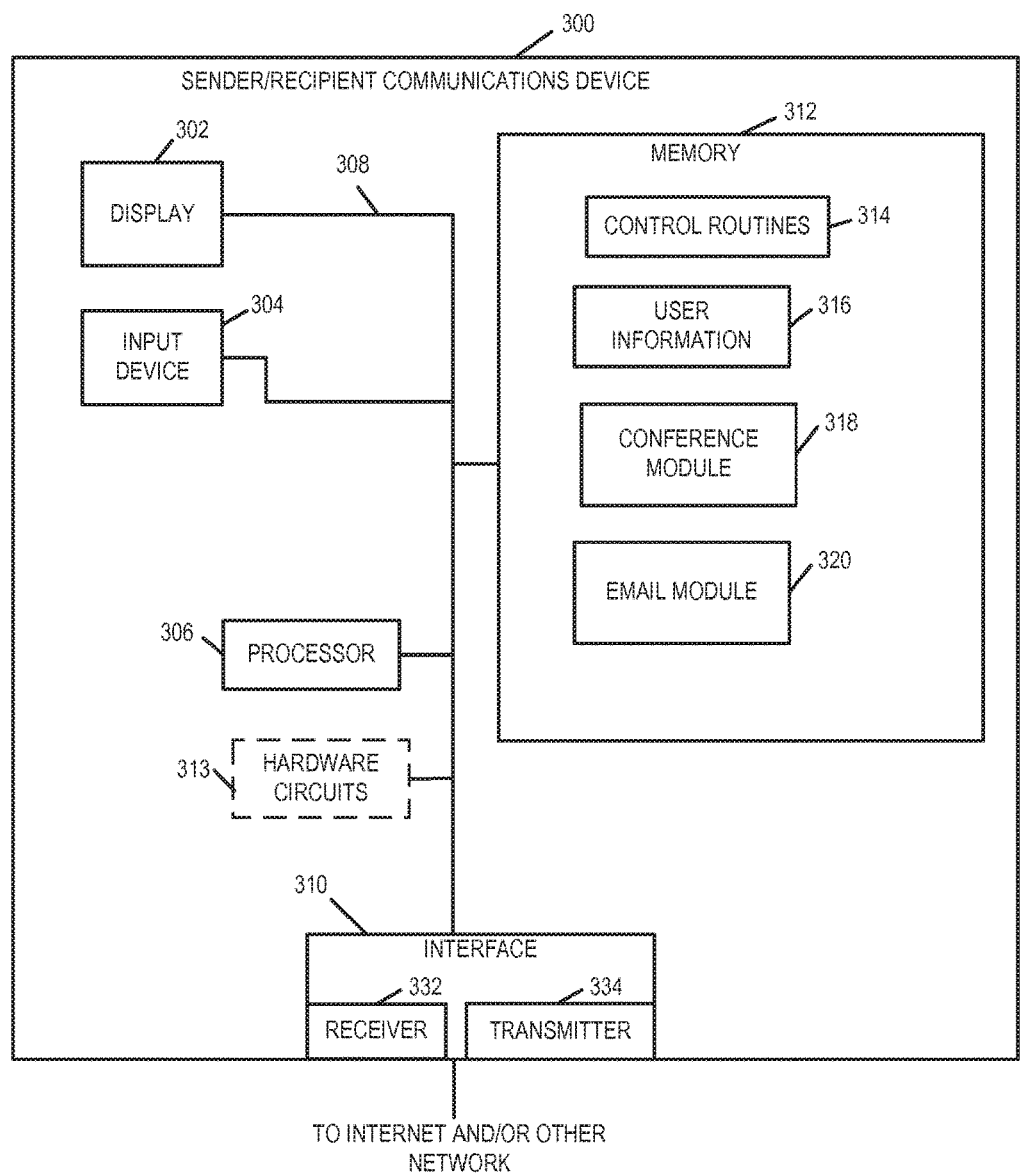
FIG. 3 illustrates an exemplary sender/recipient communications device which can be used as the host device used by a host establishing a on-line meeting or other conference or which can be used as a device of a recipient who may be invited to and join an on line meeting or other type of conference established using the methods of the invention.

FIG. 3 shows an exemplary sender or recipient communications device 300. The device 300 may be a cell phone or other communications device from which a host can send and receive Emails relating to on-line or other session establishment and from which the host may then participate in and host the established session. Participants, e.g., receivers of invitations to the session, may also use devices of the type shown in FIG. 3 to be notified of a session and to join a session, e.g., on-line meeting or conference. The host communications device 101 of system 100 of FIG. 1 may be implemented using a device 300 such as the one shown in FIG. 3. A recipient/event participant communications device (112, 114, 116) of FIG. 1 may be implemented using a device 300 such as the one shown in FIG. 3.

The communications device 300 may be a cell phone, other portable communications device or a stationary communications device. Communications device 300 includes a memory 312 including various modules, a network interface 310, a display 302, input device 304 and a processor 306. The display 302, the input device 304, the processor 306, the memory 212, and the network interface 310 are coupled together via the bus 308 over which the various elements (302, 304, 306, 310, 312) may interchange data and information. The memory 312 includes various modules and/or routines 314, 318, and 320, 222, in addition to user information 316. When executed by the processor 306 the routines and/or modules (314, 318, 320) cause the processor 306 to control the device 300 to implement the steps of the method described herein. While in FIG. 3 the modules and routines are shown as being stored in memory 312, in some embodiments hardware circuits 313 are included in the device 300 and used to perform the functions associated with the modules/routines and/or to control the apparatus 300 as described. The network interface 310 includes a receiver 332 which can be used to receive Emails and various signals and a transmitter 334 which can be used to send Emails and/or various signals.

The conference system 200 may support a wide variety of different types of conferences, e.g., voice, video, multimedia, e.g., using SIP signaling or various other types of know signaling in addition to the Email techniques discussed herein.

The current invention directly addresses various shortfalls of existing communications devices by enabling a host to launch and schedule online and phone sessions directly from within their email and scheduling/calendar tool of choice and without the need for an account with the session service provider. In addition, hosts can specify the type of session they wish to host and the service provider can then customize the session to better serve that designated use case.

The methods and apparatus described herein enable an email user to schedule or launch an online or phone session with others by simply adding a specified session-provider email address (e.g. meet@anymeeting.com, talk@anymeeting.com, share@anymeeting.com, present@anymeeting.com) to the recipient list of any email or meeting/event invitation. No account with the session provider is required in advance.

In addition in some but not necessarily all embodiments, the intended launch time of the session is inferred from the type of email sent by the host. If the email is a meeting/event invitation as may be indicated by the presence of the term invitation, invite or some other identifier in the header or the body of the Email used to indicate an invitation, the intended session is presumed to have the start time designated in the invitation Email, e.g., in the header body or an attachment of the invitation Email. If it is a regular email, e.g., one that is not determined to be an invitation, the intended session is presumed to have an immediate start time.

In some embodiments, the session-provider email address included in the recipient list of the host's email invitation is used to designate the specific type of session desired. Thus, based on the Email address which resulted in the Email being routed to a communications system of a service provider, the service provider can, and in some embodiments does, determine the type of session to be established. For example, meet@anymeeting.com can, and in some embodiments does, designate a standard web conference, talk@anymeeting.com can and in some embodiments does indicate an invitation to a conference call, while share@anymeeting.com can be used to indicate and establish a screen sharing type of session and present@anymeeting.com can and in some embodiment is used for a one-to-many presentation, such as for a webinar or training session.

The session service provider system, upon receiving such an email from the intended session host, also refereed to sometimes as the meeting or conference host, may then perform some or all of the following functions, and does perform some or all of the functions depending on the particular embodiment:

Create a user account associated with the host's email address if none yet exists.

Where the received email is a meeting/event invitation, generate an email response to the host that includes a calendar invitation for the same date and time specified in the host's invitation and contains the meeting details/instructions/links to launch the session as the host at the specified date and time. In addition, generate emails with calendar invitations to each additional invitee designated in the host's invitation containing meeting details/instructions/links for participants to join the session at the specified date and time.

Where the received email is a regular email, generate a regular email response to the host that includes meeting details/instructions/links to immediately launch the session as the host. In addition, generate emails to each additional invitee designated in the host's email that contains meeting details/instructions/links for participants to immediately join the session.

Add the intended session details to the host's new or existing user account.

Send the generated emails to the host and all invited participants.

A processor in the communications system can be configured to perform the above operations and/or control another hardware device to perform such operations.

Note that in various embodiments of the invention, other types of group online activities may be triggered, such as the creation of persistent shared workspaces or forums, or the launching of multi-player games, for example.

Additionally, in various embodiments of the invention, social media channels may be used to generate and distribute session invitations. For example, a Twitter follower of the session service provider could send a direct message (DM) to the service provider and automatically receive a meeting link that the session host could then retweet to his or her followers.

Furthermore, in various embodiments, when other contact points of session invitees are known, session invitations may be sent via other channels such as SMS, or session invitees may be called directly via dial-out capabilities provided by the service provider.

Figure 4A:
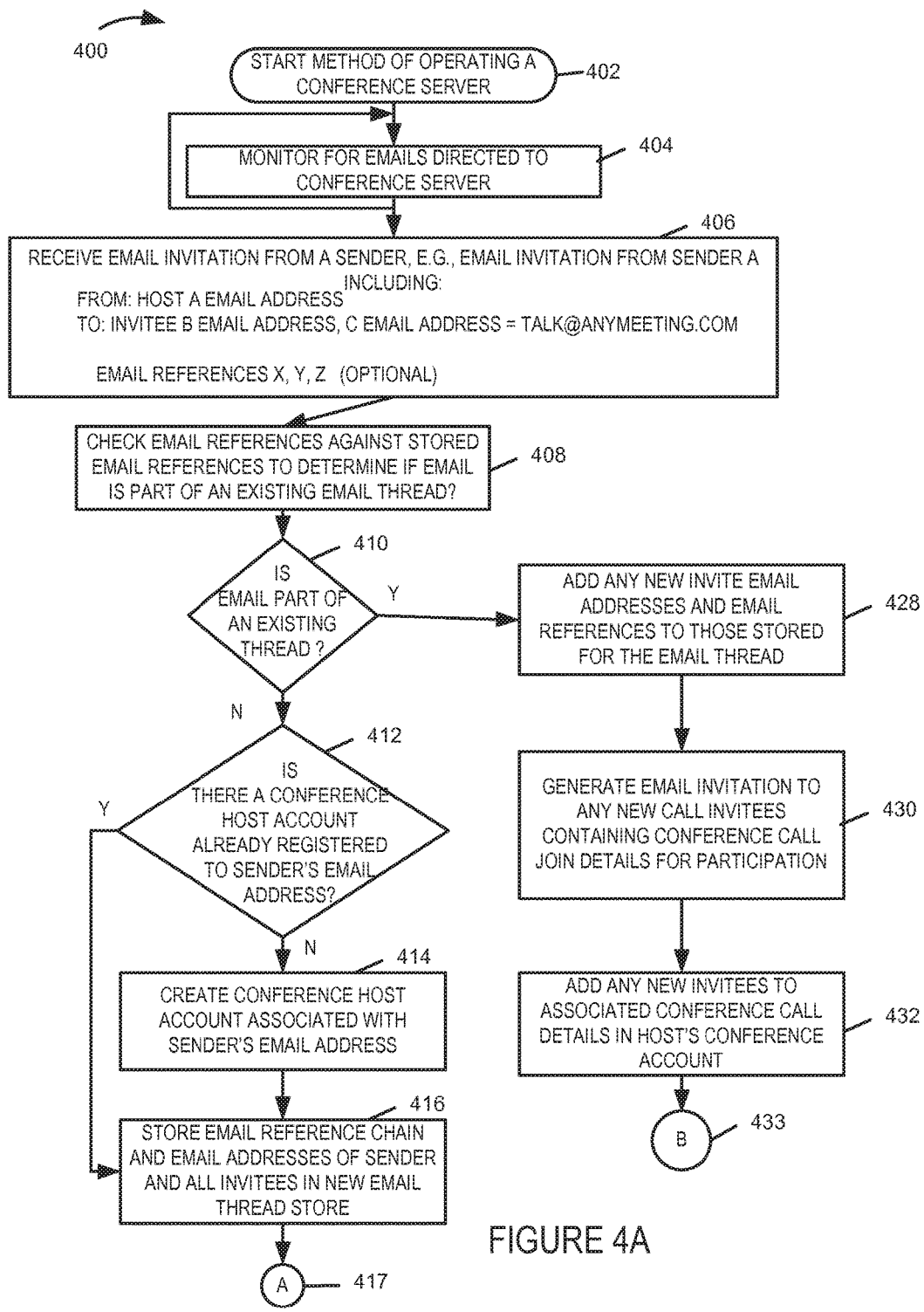
FIG. 4A is a first part of an exemplary flow chart showing steps performed by a server or combination of devices, such as by the service provider system shown in FIG. 2, which can be used to set up and/or establish a conference call or video conference via Emails that can be sent as part of the conference set up process.

FIG. 4 is an exemplary flow chart showing the steps of a method 400 performed by a server or combination of devices. The method 400 can be implemented by a conference system 200, e.g., a device including email and conferencing functionality, such as shown in FIG. 2 or service provider system 106 shown in FIG. 1, which can schedule meetings under control of the meeting and/or session and initiation module 218 and which can implement conferences, e.g., telephone or video conferences, at scheduled times using IP communications such as IP telephony or SIP signaling and/or which can support conference calls via a calls placed via conventional telephony devices and which are routed to the conference system 200 to be bridged or otherwise connected as part of a scheduled conference. In some embodiments, service provider system 106 is implemented as conference system 200, e.g., a device including email and conferencing functionality. In some embodiments the device including email and conferencing functionality is a conference server.

The method 400 begins in start step 402 when the sever 200 is powered on. In step 404 the server monitors for Emails directed to the conference server 200. As discussed above the Emails may be from hosts with an account on the conference server 200 or without an established conference account. In addition, it should be appreciated that Email may be replies to Emails which were sent by a party to a conference or host as part of the conference establishment process, e.g., as an invited conference participate replies to an Email sent to schedule a phone, video or multimedia conference to be implemented using server 200. As discussed above, Emails sent to initiate a conference and/or replies to such Emails will normally include an Email corresponding to the conference server 200. For example, an Email sent to establish a conference call may include as a recipient: talk@anymeeting.com, where talk@anymeeting.com may be an Email address of the conference server 200 which is monitored by the server and to which Emails are sent as part of establishing a voice conference call. Monitoring for Emails in step 404 occurs on an ongoing basis. As Emails are received and detected by the monitoring, operation proceeds to processing the detected Email. In step 406 an Email corresponding to the monitored address is received. For example, the received Email is an email invitation from sender A, which includes: a email address for the meeting host in the From field, an email address for at least one invitee, e.g., B Email Address in the To field, an a email address corresponding to the conference server, e.g., C email address where C email address=talk@anymeeting.com, in the To field, and may sometimes include one or more E-mail references, e.g., Email references X, Y, Z. In some embodiments, the received Email may and sometimes does include "invite" or another key word or indicator in the header or body of the message if the Email is a invitation type email. In some such embodiments, an invitation type email includes a start date and start time for the intended conference in the header, the body, or an attachment of the email.

Operation proceeds from step 406 to step 408 where the Email begins being processed In step 408 the Email being processed may have the contents of Emails discussed above which are used to establish a conference call or other type of conference. The Email may include one or more listed recipients as well as reference information which can be used to identify the conference and/or which indicates the time and type of conference to which the Email relates. In step 408 the Email is checked to determine if its contents, e.g., reference information included in the body of the Email, relates to an existing Email thread, e.g., a reply to an earlier conference scheduling Email, or if it does not correspond to an existing thread and/or conference which is being scheduled. In step 410 a determination is made if the Email is part of an existing Email thread, e.g., if the Email relates to a conference for which another Email was previously received. If the answer to the decision in step 410 is yes, operation proceeds to step 428 in which the conference server 200 updates information stored in memory corresponding to the conference to which the received Email relates. For example, invitee information may be updated to indicate an additional invitee which was not included in a previous Email relating to the conference and/or other information such as Email addresses or other information included in the Email. Thus, as a user replies to an invitation to a conference to all the parties listed on the original invite Email which included the conference server as a recipient, the conference server will learn of the additional invited party and update the conference information according. Similarly a change in the time or other scheduling information indicated in a received Email may be reflected in the information corresponding to the conference that is updated and stored by the conference server 200. In step 430, the conference server generates an email invitation to any new call invitees. The email invitation may include call join details for participants for the conference to which the received Email relates, e.g., a dial in number and participant pass code. Note that invitees who already received such information need not be provided with the information again and thus step 430 relates to new call invitees but not previous invitees unless the conference participation information has been changed in which all invites may be listed on the generated Email so that everyone invited to the conference receives the new information.

Operation proceeds from step 430 to step 432. In step 432 host information is updated so that the account corresponding to the host of the conference will reflect the new invitees and/or other information obtained from the received Email. Operation proceeds from step 432, via connecting node B 433, to step 424 in which the generated Email(s) are transmitted.

In step 410 if it is determined that the received Email does not correspond to an existing Email thread, e.g., it relates to a new conference information as indicated by the reference information included in the Email not including the reference information for a scheduled conference, operation proceeds from step 410 to step 412. In step 412 a determination is made as to whether there is a conference host account already registered to the party sending the Email, i.e., is there a conference host account associated with the sender's Email. If a host account for the sender already exists in the conference server records, operation proceeds from step 412 to step 416. However, if a host account does not already exist for the party sending the Email relating to a new conference, operation proceeds from step 412 to step 414. In step 414 a host conference account is automatically created for the sender of the received Email and associated with the sender's Email address. The account may include the name of the sender and/or other information which may be looked up based on the sender's email address, obtained from the received Email or through other means such as by sending a request for account information to the senders Email address to which the sender can reply with personal and/or billing information.

Once a host conference account is set up, operation proceeds from step 414 to step 416 where the received Email is stored as part of an Email chain being maintained as part of the conference establishment process. Other Emails received subsequently relating to the same conference may be, and sometimes are, stored in memory with the previously received Email thereby updating the Email chain relating to a conference and preserving the information included in the Emails for future reference and use. Since, in step 416 the storage relates to a new conference which the received Email is the initial Email relating to establishment of the particular conference, the storage performed in step 416 is in the form of a new Email thread relating to the conference which is to be established.

Operation proceeds from step 416, via connecting node A 417, to 418 in which an email invitation is generated and addressed to the sender of the received Email providing the sender, e.g., the party initiating the conference, with conference call launch details specific to the host as well as potentially other information relating to the conference. For example, the Email addressed to the sender may provide a host PIN (number) which must be entered to allow the conference participants to be placed into conference. The Email to the host may also include dial in information, participant information and/or other information which may also be provided via separate Email to the participants. Operation proceeds from step 418 to step 420 in which a email invitation to the invitees is generated. The Email inviting the invitees to the conference being set up includes call join details for the participants and/or other information. For example the Email to the invitees may include a dial in number and a participant passcode which is different from the host passcode. The Email to the invitees may include other information identifying the invitees and will normally list Email addresses corresponding to the invites as a destination address. Such addresses may be and sometimes are obtained from the Email received from the host. The sender Email address of the Email generated by the server and directed to the host as well as the Email directed to the invitees may have a sender address which is an Email address of the conference server.

Operation proceeds form step 420 to step 422 wherein the host's conference account information is updated to include the information corresponding to the scheduled conference including, for example, dial in information, passcode, participants, Email addresses of participants, etc. The host's conference account also includes the Email address of the host which can be used to match Emails sent by the host to the host's conference account. Individual conferences may also be assigned a conference identifier which may be included in the Emails providing conference information to the host and invitees as well as included in the information stored in the host's account. The conference information may and also normally does include date and time information.

Operation proceeds from step 422 to step 424 in which the generated Emails are sent, e.g., to the host and/or invited parties.

Operation proceeds from step 424 to step 434 in which the server 200 or other device hosts the conference, e.g., by allowing the invited parties and host to dial in and then bridging the calls. Duration and information on the participants, e.g., which invited parties joined the call, is generated, In step 436, the host's conference account information is updated to included information about the conference that was conducted and/or to update billing information corresponding to the host so that the host is charged for the conference call.

In the above described manner a conference can be easily established through the use of Email without requiring the host to have a preexisting conference account with the service provider. In addition invitees and/or other individual to whom Emails are sent as part of the conference call setup procedure with the server receiving the Emails as part of the replies to invitations and updating conference information accordingly. In some but not necessarily all embodiments, when the Email server detects an attempt to invite a new party to the conference, the new party will automatically be supplied with conference participation information via Email with the information being redistributed to conference participants who already received the information from the conference server via an earlier Email.

In an exemplary embodiment, host communications device 101 may be, and sometimes is, an existing email client of a service provider corresponding to service provider system 106 including an email server with domain name anymeeting.com. Thus, host communications device 101 may have an existing account with the service provide, e.g., AnyMeeting. Alternatively, the host communications device 101, may not happen to be an existing client of the service provider and may not have an existing account with service provider, e.g., AnyMeeting. In some such embodiments, an account is created for a new email client as part of the exemplary method of establishing an email conference.

In some embodiments, from an email client, when creating a regular email or a meeting/event invitation, the sender, e.g., host communications device 101, includes [activity]@anymeeting.com in the recipient list. Various alternative activities are possible. For example, the host communications device 101 includes one of: meet@anymeeting.com, talk@anymeeting.com, share@anymeeting.com, or present@anymeeting.com in the recipient list. In some embodiments, a regular email designates an activity intended to start immediately, while a meeting/event invitation designates an activity to be scheduled for a future time/date.

The service provider system 106 receives and processes the regular email or meeting invitation from the host device, e.g., host communications device 101. Based on the activity specified in the anymeeting email address included in the email or meeting/event invitation, e.g., meet, talk, share, present), the service provider system 106 triggers actions to facilitate the launching and/or scheduling of the specified group activity.

In a first example, a host communications device, e.g., host communications device 101, generates and sends a meeting invitation including meet@anymeeting.com in the recipient list. The generated meeting invitation includes information indicating the meeting is to be scheduled for a future time/date. The service provider system 106 receives and processes the meeting invitation. If no AnyMeeting account exists registered to the sender's email address, the service provider system 106 creates an AnyMeeting user account for the host. The service provider system 106 generates a meeting/event invitation email to the sender/activity host, e.g., device 101, including online meeting launch details specific to the host. The service provider system 106 generates a meeting/event invitation email to recipients/activity participants, e.g., devices (112, 114, 116) including online meeting join details for the participants. The service provider system 106 adds the scheduled meeting to the host's AnyMeeting account. The service provider system 106 sends the generated emails.

In a second example, a host communications device, e.g., host communications device 101, generates and sends a regular email including talk@anymeeting.com in the recipient list. The generated regular email includes information indicating that the designated activity is intended to start immediately. The service provider system 106 receives and processes the regular email. If no AnyMeeting account exists registered to the sender's email address, the service provider system 106 creates an AnyMeeting user account for the host. The service provider system 106 generates an email to meeting/event invitation email to the sender/activity host, e.g., device 101, including audio conference details specific to the host, e.g., dial-in and PIN codes, VoIP link, etc.). The service provider system 106 generates an email to recipients/activity participants, e.g., devices (112, 114, 116) including audio conference join details for the participants. The service provider system 106 sends the generated emails.

Figures 5, 5A, 5B:
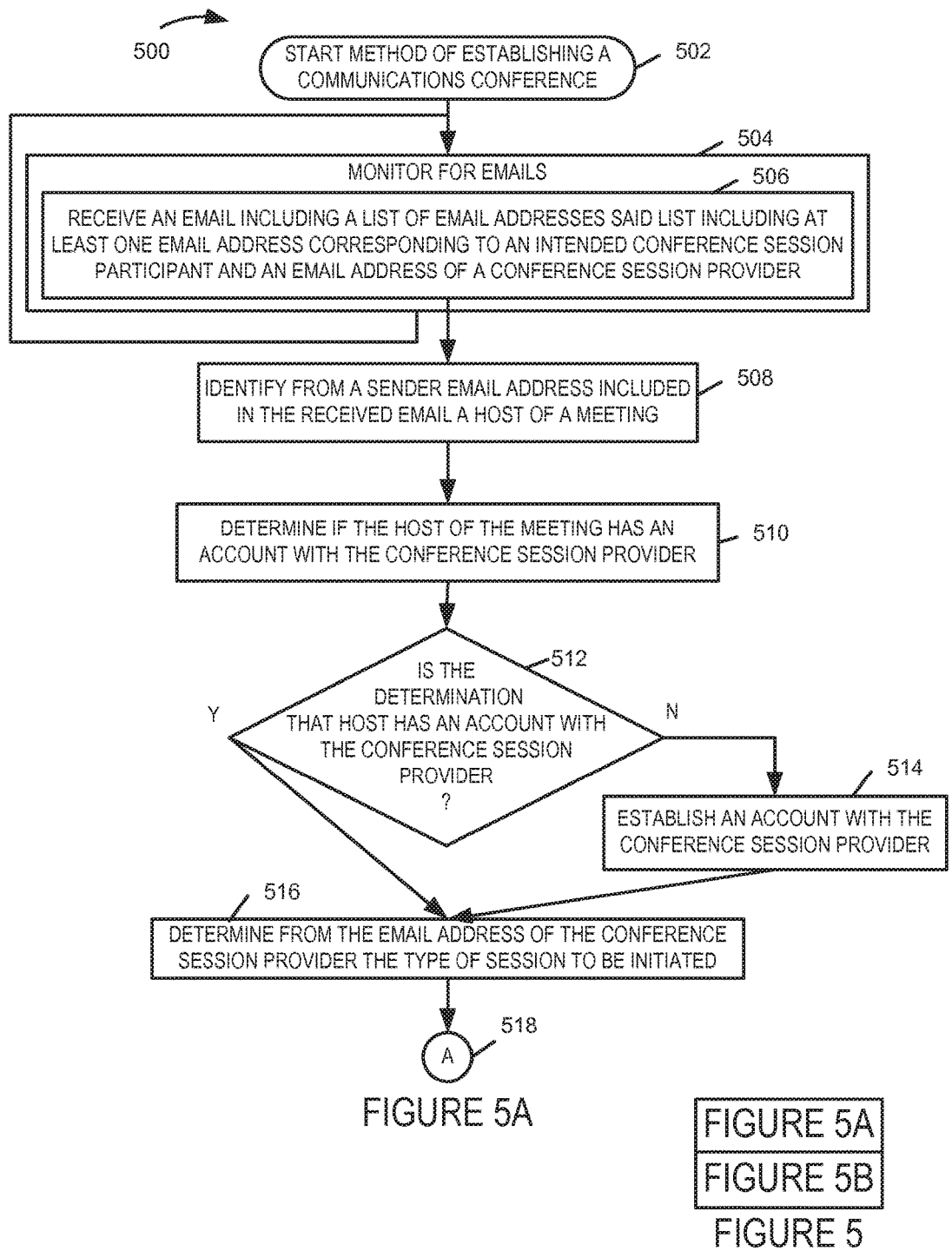
FIG. 5A is a first part of a flowchart of an exemplary method of establishing a communications conference in accordance with an exemplary embodiment.
FIG. 5B is a second part of a flowchart of an exemplary method of establishing a communications conference in accordance with an exemplary embodiment.
FIG. 5 comprise the combination of FIG. 5A and FIG. 5B.
Figure 5B:
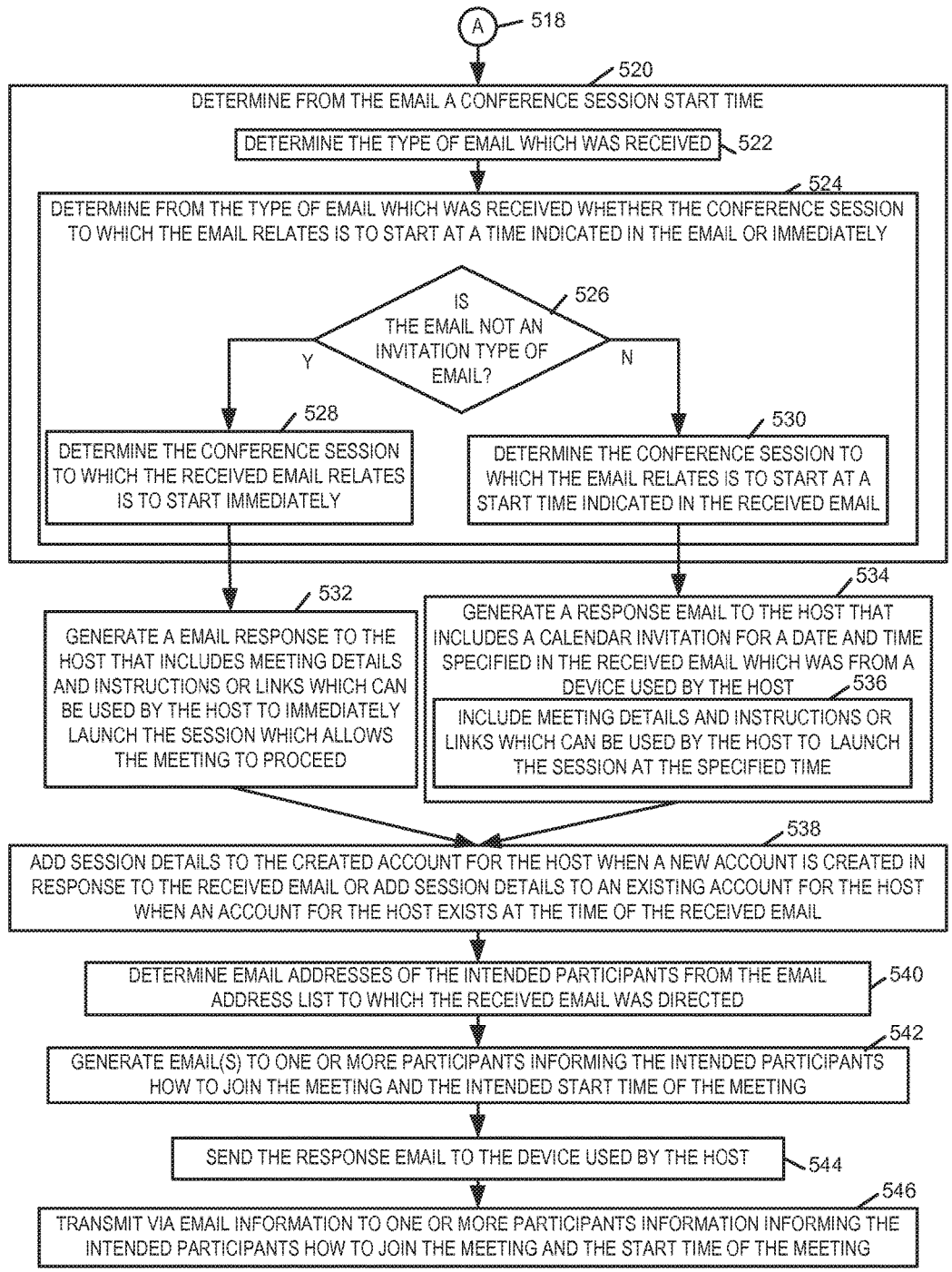

FIG. 5, comprising the combination of FIG. 5A and FIG. 5B, is a flowchart 500 of an exemplary method of establishing a communications conference in accordance with various exemplary embodiments. The exemplary method of flowchart 500 may be performed by service provide system 106, e.g., a conferencing system and/or service provider system 200, e.g., a conferencing system. In some embodiments, service provider system 106 and/or service provider system 200 is a device, e.g., a server supporting emails and conferencing. FIG. 5 will now be described for an embodiment in which the method is performed by a server including email and conferencing functionality; however, it should be appreciated the method 500 of FIG. 5 may be, and in some embodiments is performed by a plurality of devices coupled together, e.g., an Email server and a conferencing device, e.g., a conferencing bridge, coupled together.

Operation of the exemplary method starts in step 502, in which the server including email and conferencing functionality is powered on and initialized. Operation proceeds from step 502 to step 504. In step 504, the server monitors for emails. Step 504 is performed on an ongoing basis. Step 504, may and sometimes does, include step 506 in which the server receives and email including a list of email addresses, said list including at least one email address corresponding to an intended conference session participant and an email address of a conference session provider. In some embodiments, the list of email addresses is included in a destination address field of said received Email. In some such embodiments, the destination address field of the received Email is a To field of the received Email. In some embodiments, the list of email addresses is included in a composite of the To Field and the CC field of the received Email. Exemplary email addresses corresponding to conference session participants include, e.g., email addresses corresponding to devices (112, 114 and/or 116). The received email address of the conference session provider is, e.g., one of: meet@anymeeting.com, talk@anymeeting.com, share@anymeeting.com, or present@anymeeting.com. Operation proceeds from step 506 to step 508.

In step 508 the server identifies from a sender email address included in the received email a host of a meeting. In some embodiments, the Email address corresponding to a host seeking to initiate a conference session is included in a sender address field of the received Email. In some such embodiments, the sender address field is a From field of the received Email. An exemplary sender email address is an email address corresponding to device 101. Operation proceeds from step 508 to step 510.

In step 510 the server determines if the host of the meeting has an account with the conference session provider. For example, the server determines if there is a conference host account already registered to the party sending the received Email, i.e., is there a conference host account associated with senders Email address. In various embodiments, the server checks a database, e.g., customer information/conference information database 110 to make the determination. Operation proceeds from step 510 to step 512.

In step 512, if the determination of step 510 is that the host has an account with the conference session provider, then operation proceeds from step 512 to step 516. However, in step 512, if the determination of step 510 is that the host does not have an account with the conference session provider, then operation proceeds from step 512 to step 514. In step 514 the server establishes an account with the conference session provider. In various embodiments, in step 514 a host conference account is automatically created for the sender of the received Email and associated with the sender's Email address. The account may include the name of the sender and/or other information which may be looked up based on the sender's email address, obtained from the received Email or through other means such as by sending a request for account information to the sender's Email address to which the sender can reply with personal and/or billing information. Operation proceeds from step 515 to step 516.

In step 516 the server determines from the email address of the conference session provider the type of session to be initiated. For example if the email address of the conference session provider included in the received Email is: meet@anymeeting.com, the server determines that the type of session to be initiated is a web conference type session. As another example, if the email address of the conference session provider included in the received Email is: talk@anymeeting.com, the server determines that the type of session to be initiated is a conference call type session. As another example, if the email address of the conference session provider included in the received Email is: share@anymeeting.com, the server determines that the type of session to be initiated is a screen sharing type session. As another example, if the email address of the conference session provider included in the received Email is: present@anymeeting.com, the server determines that the type of session to be initiated is a one-to-may presentation such as for a webinar or training session. Operation proceeds from step 516, via connecting node A 518, to step 520.

In step 520 the server determines from the received email a conference session start time. Step 520 includes step 522 and step 524.

In step 522 the server determines the type of email which was received. In some embodiments, there are two types of emails: regular type emails and meeting/event invitation type emails. In some embodiments, if the received Email is a meeting or event type email "invite" or some other identifier is included in the header or body of the received Email and used to indicate an invitation. In some such embodiments, the indented session is presumed to have the start date and start time designated in the received invitation type Email, e.g., in the header, body or an attachment of the received invitation type Email. In some embodiments, if it is a regular email, e.g., one that is not determined to be an invitation type email, the intended session is presumed to have an immediate start time. Thus, in various embodiments, the server determines the type of email based on the results of a search of the receive Email header and/or body, searching for the word "invite" or some other marker. In some such embodiments, the search may, and sometimes does further includes a search of the received Email for a start date and/or start time corresponding to the invitation. In some such embodiments, the search for the start date and/or start time corresponding to the invitation includes the header, body and attachments of the received Email.

Operation proceeds from step 522 to step 524. In step 524 the server determines from the type of email which was received whether the conference session to which the email relates is to start at a time indicated in the email or immediately. Step 524 includes steps 526, 528 and 530. In step 526 the server control operation as a function of the type of email. If the email is not an invitation type of email, then operation proceeds from step 526 to 528 in which the server that the conference session to which the received email relates is to start immediately. If the email is an invitation type of email, e.g., a meeting invitation or event type email including a meeting or event start time, then operation proceeds from step 526 to step 530 in which the server determines that the conference session to which the email relates is to start at a start time indicated in the received email.

Operation proceeds from step 528 to step 532 in which the server generates an email response to the host that indicates meeting details and instructions and/or links which can be used by the host to immediately launch the session which allows the meeting to proceed. The email response to the host provides the sender, e.g., the party initiating the conference, with conference launch details specific to the host as well as potentially other information relating to the conference. For example, the Email addressed to the sender (host) may provide a host PIN (number) which is to be entered to allow the conference participants to be placed in to conference. The response Email to the host may also include, e.g., dial in information, participant information and/or other information which may be provided via separate Email to the participants.

Operation proceeds from step 530 to step 534, in which the server generates a response email to the host that includes a calendar initiation for a date and time specified in the received email which was from a device used by the host. Step 534 includes step 536 in which the server includes in the response email meeting details and instructions and/or links which can be used by the host to launch the session at the specified time. The email response to the host provides the sender, e.g., the party initiating the conference, with conference launch details specific to the host as well as potentially other information relating to the conference. For example, the Email addressed to the sender (host) may provide a host PIN (number) which is to be entered to allow the conference participants to be placed in to conference. The response Email to the host may also include, e.g., dial in information, participant information and/or other information which may be provided via separate Email to the participants.

Operation proceeds from step 532 or step 534 to step 538. In step 538 the server adds session details to the created account for the host when a new account is created in response to the received email or adds session details to an existing account for the host when an account for the host exists at the time of the received email. Operation proceeds from step 538 to step 540.

In step 540 the server determines email addresses of the intended participants from the email address list to which the received email was directed. Operation proceeds from step 540 to step 542 in which the server generates an email(s) to one or more participants informing the intended participants how to join the meeting and the intended start time of the meeting. For example, the join information may include, e.g., a dial in number for a conference call, a participant pass code which is different from a host passcode, etc. The email to the invitees may include other information identifying the invitees and will normally list Email addresses corresponding to the invitees as a destination address. Such addresses may be, and sometimes are obtained from the Email received from the host. The sender email address of the Email generated by the server and directed to the invites may have a sender address which is an Email address of the conference server. In some embodiments, the same email is send to each of the intended participants. In some embodiments, a different email is sent to at least some different participants. In some such embodiments, the email addresses of at least some participants are not made known to at least some other participants.

Operation proceeds from step 542 to step 544. In step 544 the server sends the response email to the device used by the host. If the response email was generated in step 534, in step 544 the server sends the response email to the device used by the host to trigger updating of a calendar maintained by the host device to include the meeting invitation.

Operation proceeds from step 544 to step 546, in which the server transmits via email information to one or more participants information informing the intended participants how to join the meeting and the start time of the meeting. Thus in step 546 the server sends the response email(s) generated in step 542 to the intended participants.

An exemplary conference system 200, in accordance with some embodiments includes: an interface 210 configured to receive an Email including a list of email addresses said list including at least one email address corresponding to an intended conference session participant and an Email address of a conference session provider; and a processor 208 configured to: identify from a sender Email address included in the received Email a host of a meeting; determine if the host of the meeting has an account with the conference session provider; and if the host of the meeting does not have an account with the session provider establish an account with the conference session provider.

In some embodiments, said list of email addresses is included in a destination address field of said received Email, and an Email address corresponding to a host seeking to initiate a conference session is included in a sender address field of said received Email. In some such embodiments, the destination address field is a To field and wherein said sender address field is a From field.

In various embodiments, the processor 208 is further configured to determine from the Email address of the conference session provider the type of session to be initiated.

In some embodiment, the processor 208 is configured to determine from the Email a conference session start time. In some such embodiments the processor 208 is configured to: determine the type of Email which was received and determine from the type of Email whether a conference session to which the received Email relates is to start at a time indicated in the Email or immediately, as part of being configured to determine the conference session start time.

In some embodiments, the processor 208 is configured to determine the conference session to which the received Email relates is to start immediately when the Email is not an invitation type of Email as part of being configured to determine from the type of Email whether the conference session to which the received Email relates is to start at a time indicated in the Email or immediately. In various embodiments, the processor 208 is configured to determine the conference session to which the received Email relates is to start at a start time indicated in the received Email when the received Email is a meeting invitation or event invitation Email including a meeting or event start time as part of being configured to determine from the type of Email whether the conference session to which the received Email relates is to start at a time indicated in the Email or immediately.

In various embodiments, processor 208 is configured to: generate a response Email to the host that includes a calendar invitation for a date and time specified in the received Email which was from a device used by the host; and send the response Email to the device used by the host to trigger updating of a calendar maintained by the host device to include the meeting information.

In some embodiments, processor 208 is configured to generate an Email response to the host that includes meeting details and instructions or links which can be used by the host to immediately launch the session which allows the meeting to proceed when the Email is not an invitation Email.

In various embodiments, processor 208 is configured to add session details to the created account for the host when a new account is created in response to the received Email or adding the session details to an existing account for the host when an account for the host exists at the time of the received Email.

In various embodiments, processor 208 is configured to transmit via Email information to one or more intended participants informing the intended participants how to join the meeting and the start time of the meeting. In some such embodiments, processor 208 is configured determine Email addresses of the intended participants from the Email address list to which the received Email was directed, prior to transmitting information to one or more participating informing the intended participants how to join the meeting.

From the above discussion it should be appreciated that numerous variations and embodiments are possible.

The techniques of various embodiments may be implemented using software, hardware and/or a combination of software and hardware. In some embodiments modules are implemented fully as hardware, e.g., as circuits. In some embodiments a circuit is provided for each module. Various embodiments are directed to apparatus, e.g., servers, nodes, computers, etc. Various embodiments are also directed to methods, e.g., methods of performing risk checking. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments servers/nodes described herein are implemented using one or more modules to perform the steps corresponding to one or more methods, for example, signal receiving, processing, generation and/or transmission steps. Thus, in some embodiments various features are implemented using modules. Such modules may be implemented using software, hardware or a combination of software and hardware. Thus, in at least some embodiments the modules are hardware modules. Many of the above described methods or method steps can be implemented using machine, e.g., computer, executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., control node, including a processor configured to implement one, multiple or all of the steps of one or more methods of the invention.

In some embodiments, the processor or processors, e.g., CPUs, of one or more devices, e.g., server or other node, are configured to perform one or more of the steps of the methods described herein. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., a server, with a processor which includes a module corresponding to each of the steps of the various described methods performed by the device in which the processor is included. In some but not all embodiments, a device, e.g., a server, includes a module corresponding to each of the steps of the various described methods performed by the device in which the processor is included. The modules may be implemented using software and/or hardware.

Some embodiments are directed to a computer program product comprising a non-transitory computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a node. The code may be in the form of machine, e.g., computer, executable instructions stored on a non-transitory computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device, control device or other device described in the present application.

What is claimed is:

1. A method of operating a communication service provider system, comprising:
receiving, at an email server within the communication service provider system, a first email from a first communications device, the first email containing a sender email address, one or more recipient email addresses, and a communication service provider email address, the communication service provider email address not being assigned to an individual user;
scanning the first email to determine that the first email contains an invitation to participate in an online meeting;
determining that the sender email address is not associated with an account egistered with the communication service provider;
in response to the determination that the sender email address is not associated with a conference host account registered with the communication service provider;
automatically creating a conference host account, with the communication service provider, associated with the sender email address without further input from the sender email address;
automatically storing an email reference chain associated with the first email along with the sender email address and the one or more recipient email addresses in an email thread store, the email reference chain including one or more emails pertaining to the online meeting;
generating, using information from the first email, a sender email invitation containing conference call launch details specific to a host of an online conference call;
generating, using information from the first email, one or more invitee email invitations containing conference call join details for participants of the online conference call;
sending the sender email invitation to the sender email address; and
sending the one or more invitee email invitations to the one or more recipient email addresses.

2. The method of claim 1, further comprising:
receiving, at the email server, a second email from a second communications device, the second email containing a sender email address, one or more recipient email addresses, and a communication service provider email address containing a domain matching a domain of the email server, the communication service provider email address not being assigned to an individual user;
determining that the second email is part of an existing email thread by searching the email thread store for a matching email reference chain;
in response to the determining that the second email is part of an existing email thread, adding any recipient email addresses in the second email that were not listed as recipient email addresses in the first email to the stored recipient email addresses in the email thread store;
generating, using information from the second email, one or more additional invitee email invitations for any recipient email addresses in the second email that were not listed as recipient email addresses in the first email, the one or more invitee email invitations containing conference call join details for participants of the online conference call; and
sending the one or more additional invitee email invitations to the one or more recipient email addresses.

3. The method of claim 1, wherein the created conference host account includes details about the host that have been retrieved from the first email.

4. The method of claim 2, wherein the details include a name of the host.

5. The method of claim 3, wherein the created conference host account includes details about one or more participants that have been retrieved using details in the first email.

6. The method of claim 1, wherein the sender email invitation includes a host pin number.

7. The method of claim 1, wherein the sender email invitation and the one or more invitee email invitations include a password to be used to access the online conference call.

8. A system for operating a service provider communication system comprising:
a non-transitory computer readable medium having instructions stored thereon, which, when executed by a processor, cause the system to:
receive, at an email server within the communication service provider system, a first email from a first communications device, the first email containing a sender email address, one or more recipient email addresses, and a communication service provider email address, the communication service provider email address not being assigned to an individual user;
scan the first email to determine that the first email contains an invitation to participate in an online meeting;
determine that the sender email address is not associated with an account registered with the communication service provider;
in response to the determination that the sender email address is not associated with a conference host account registered with the communication service provider;
automatically create a conference host account, with the communication service provider, associated with the sender email address without further input from the sender email address;
automatically store an email reference chain associated with the first email along with the sender email address and the one or more recipient email addresses in an email thread store, the email reference chain including one or more emails pertaining to the online meeting;
generate, using information from the first email, a sender email invitation containing conference call launch details specific to a host of an online conference call;
generate, using information from the first email, one or more invitee email invitations containing conference call join details for participants of the online conference call;
send the sender email invitation to the sender email address; and
send the one or more invitee email invitations to the one or more recipient email addresses.

9. The system of claim 8, wherein the instructions further cause the system to:
receive, at the email server, a second email from a second communications device, the second email containing a sender email address, one or more recipient email addresses, and a communication service provider email address containing a domain matching a domain of the email server, the communication service provider email address not being assigned to an individual user;
determine that the second email is part of an existing email thread by searching the email thread store for a matching email reference chain;
in response to the determining that the second email is part of an existing email thread, add any recipient email addresses in the second email that were not listed as recipient email addresses in the first email to the stored recipient email addresses in the email thread store;
generate, using information from the second email, one or more additional invitee email invitations for any recipient email addresses in the second email that were not listed as recipient email addresses in the first email, the one or more invitee email invitations containing conference call join details for participants of the online conference call; and
send the one or more additional invitee email invitations to the one or more recipient email addresses.

10. The system of claim 8, wherein the created conference host account includes details about the host that have been retrieved from the first email.

11. The system of claim 9, wherein the details include a name of the host.

12. The system of claim 10, wherein the created conference host account includes details about one or more participants that have been retrieved using details in the first email.

13. The system of claim 8, wherein the sender email invitation includes a host pin number.

14. The system of claim 8, wherein the sender email invitation and the one or more invitee email invitations include a password to be used to access the online conference call.

15. A non-transitory machine-readable storage medium comprising instructions which, when implemented by one or more machines, cause the one or more machines to perform operations for operating a communication service provider system, the operations comprising: receiving, at an email server within the communication service provider system, a first email from a first communications device, the first email containing a sender email address, one or more recipient email addresses, and a communication service provider email address, the communication service provider email address not being assigned to an individual user;
scanning the first email to determine that the first email contains an invitation to participate in an online meeting;
determining that the sender email address is not associated with an account registered with the communication service provider;
in response to the determination that the sender email address is not associated with a conference host account registered with the communication service provider;
automatically creating a conference host account, with the communication service provider, associated with the sender email address without further input from the sender email address;
automatically storing an email reference chain associated with the first email along with the sender email address and the one or more recipient email addresses in an email thread store, the email reference chain including one or more emails pertaining to the online meeting;
generating, using information from the first email, a sender email invitation containing conference call launch details specific to a host of an online conference call;
generating, using information from the first email, one or more invitee email invitations containing conference call join details for participants of the online conference call;
sending the sender email invitation to the sender email address; and
sending the one or more invitee email invitations to the one or more recipient email addresses.

16. The non-transitory machine-readable storage medium of claim 15, wherein the operations further comprise:

receiving, at the email server, a second email from a second communications device, the second email containing a sender email address, one or more recipient email addresses, and a communication service provider email address containing a domain matching a domain of the email server, the communication service provider email address not being assigned to an individual user;

determining that the second email is part of an existing email thread by searching the email thread store for a matching email reference chain;

in response to the determining that the second email is part of an existing email thread, adding any recipient email addresses in the second email that were not listed as recipient email addresses in the first email to the stored recipient email addresses in the email thread store;

generating, using information from the second email, one or more additional invitee email invitations for any recipient email addresses in the second email that were not listed as recipient email addresses in the first email, the one or more invitee email invitations containing conference call join details for participants of the online conference call; and sending the one or more additional invitee email invitations to the one or more recipient email addresses.

17. The non-transitory machine-readable storage medium of claim 16, wherein the created conference host account includes details about the host that have been retrieved from the first email.

18. The non-transitory machine-readable storage medium of claim 16, wherein the details include a name of the host.

19. The non-transitory machine-readable storage medium of claim 17, wherein the created conference host account includes details about one or more participants that have been retrieved using details in the first email.

20. The non-transitory machine-readable storage medium of claim 15, wherein the sender email invitation includes a host pin number.

* * * * *

UNITED STATES PATENT AND TRADEMARK OFFICE
CERTIFICATE OF CORRECTION

PATENT NO. : 10,462,195 B2
APPLICATION NO. : 16/156539
DATED : October 29, 2019
INVENTOR(S) : Tuculescu et al.

It is certified that error appears in the above-identified patent and that said Letters Patent is hereby corrected as shown below:

In the Claims

Column 18, Line 7, Claim 1, delete "egistered" and insert --registered-- therefor Signed and Sealed this
Twenty-first Day of April, 2020

Andrei Iancu
*Director of the United States Patent and Trademark Office*